US012634732B2

(12) United States Patent
Blake et al.

(10) Patent No.: US 12,634,732 B2
(45) Date of Patent: May 19, 2026

(54) MONITORING PERFORMANCE OF A UTILITY SUPPLY NETWORK USING SCHEDULED AND TRIGGERED MEASUREMENTS OF PERFORMANCE CHARACTERISTICS FROM USER EQUIPMENT

(71) Applicant: SPATIALBUZZ LIMITED, Guildford (GB)

(72) Inventors: Andrew Robert Blake, Guildford (GB); Michael Shannon, Redhill (GB); Christopher John Haslett, Burgh Heath (GB)

(73) Assignee: SPATIALBUZZ LIMITED, Guildford (GB)

( * ) Notice: Subject to any disclaimer, the term of this patent is extended or adjusted under 35 U.S.C. 154(b) by 160 days.

(21) Appl. No.: 17/214,129

(22) Filed: Mar. 26, 2021

(65) Prior Publication Data

US 2021/0306891 A1     Sep. 30, 2021

(30) Foreign Application Priority Data

Mar. 27, 2020     (GB) ..................................... 2004450

(51) Int. Cl.
*H04W 24/10*          (2009.01)
*H04W 4/38*           (2018.01)
*H04W 24/08*          (2009.01)

(52) U.S. Cl.
CPC ............. *H04W 24/10* (2013.01); *H04W 4/38* (2018.02); *H04W 24/08* (2013.01)

(58) Field of Classification Search
CPC ....... H04W 24/10; H04W 4/38; H04W 24/08; H04W 24/04; H04L 43/065;
(Continued)

(56) References Cited

U.S. PATENT DOCUMENTS 7,554,929 B1 *   6/2009   Omar ...................... H04L 43/50
                                                            370/252
10,341,355 B1 *  7/2019   Niemoller ............. H04L 63/104
(Continued)

FOREIGN PATENT DOCUMENTS

CN          102291473 B  *  8/2013
EP            3605956 A1    2/2020
(Continued)

OTHER PUBLICATIONS

Patents Act 1977: Search Report under Section 17 for Application No. GB2004450.9 dated Sep. 10, 2020, 7 pages.

*Primary Examiner* — Mounir Moutaouakil
(74) *Attorney, Agent, or Firm* — Aikin & Gallant, LLP

(57)          ABSTRACT

A network monitoring system is provided for monitoring performance of a utility supply network. The system comprises an asynchronous subsystem configured to receive scheduled measurements of network performance characteristics from a plurality of user equipments (UEs) connected to the network, and to store the scheduled measurements in a database. The system also comprises a synchronous subsystem configured to receive triggered measurements of network performance characteristics from at least one UE connected to the network, and to store the triggered performance measurements in the database.

13 Claims, 2 Drawing Sheets

(58) Field of Classification Search
CPC ............. H04L 41/0604; H04L 41/0677; H04L
43/0852; H04L 43/087; H04L 41/50;
H04L 43/50
See application file for complete search history.

(56) References Cited

U.S. PATENT DOCUMENTS

| | | | |
|---|---|---|---|
| 10,659,481 B2 * | 5/2020 | Boutnaru | ............ H04L 63/1416 |
| 10,826,977 B2 * | 11/2020 | Carr | .................... H04L 67/1001 |
| 11,363,046 B2 * | 6/2022 | Boutnaru | ............ H04L 63/1425 |
| 2003/0105604 A1 * | 6/2003 | Ash | ................. H04N 21/64738 |
| | | | 702/100 |
| 2011/0246640 A1 * | 10/2011 | Saha | ................... H04L 43/0817 |
| | | | 709/224 |
| 2017/0019291 A1 | 1/2017 | Tapia et al. | |
| 2017/0171040 A1 | 6/2017 | Randolph et al. | |
| 2018/0007073 A1 * | 1/2018 | Boutnaru | ............ H04L 63/1425 |
| 2018/0176111 A1 | 6/2018 | Lopes | |
| 2020/0162532 A1 * | 5/2020 | Billonneau | .......... H04N 21/632 |

FOREIGN PATENT DOCUMENTS

| | | | | | |
|---|---|---|---|---|---|
| EP | 3031137 B1 * | 1/2022 | ............... | G06F 1/08 |
| WO | WO-2020104222 A1 * | 5/2020 | ............... | G06F 3/14 |

* cited by examiner

MONITORING PERFORMANCE OF A UTILITY SUPPLY NETWORK USING SCHEDULED AND TRIGGERED MEASUREMENTS OF PERFORMANCE CHARACTERISTICS FROM USER EQUIPMENT

CROSS REFERENCE TO RELATED APPLICATIONS

The present application claims the priority benefit of United Kingdom Patent Application No. GB 2004450.9, entitled "NETWORK MONITORING SYSTEM" and filed on Mar. 27, 2020, which is incorporated by reference herein in its entirety.

FIELD OF THE INVENTION

The invention relates to a network monitoring system for monitoring performance of a utility supply network, such as a communications network.

BACKGROUND

Faults occur in utility supply networks, as in all other complex technical systems. In cellular communications networks, such faults include the failure of hardware components in the base-stations of a mobile network, and failures in other systems which are connected to multiple base-stations. For example faults in the radio network controller (RNC) in a 3G system may result in the loss of operation of large sections of the network (e.g. all node B base-stations connected to the RNC). Similarly, failures to switching and other more centralised functions can also impact multiple areas of the network simultaneously.

When such failures occur, it is important to identify them as quickly as possible, so that simple, remote, measures may be taken to alleviate the fault (e.g. re-setting a piece of network equipment) or so that a maintenance team can be dispatched to repair the fault and restore service to the customers of the network. It is also important to enable customers to be kept informed about the fact that a failure has occurred, and about the progress of any repair and the likely time at which service will be restored. Such information on service failures and repair progress may be provided by a telephone operator on a 'helpline' provided by the network operator or via a web-page, mobile phone 'App' or other similar interface available to the end user of the network services.

In other situations, network services may be suspended in order to carry out planned maintenance or upgrades to the network. In such circumstances, the elements of the network (e.g. base-station or stations) which will be affected are known in advance and the duration of the service outage can also be estimated with a reasonable degree of certainty.

In still other situations, poor service may occur as a result of congestion on the network—i.e. too many users attempting to make use of the network's resources, simultaneously. Such situations can occur, for example, during rush hour at a busy train station or around the time of an irregular event, such as a sports match or music concert, at a particular location.

In conventional systems, operators rely upon a disparate array of systems for managing and reporting faults, planned network outages, progress updates for repairs which are underway and the identification and location of congestion events and other aspects which impact the customer's experience of a mobile operator's network. As a customer, however, all of the above causes result in a single outcome: poor (or no) mobile service. Reporting the fact that such issues are known (or not, which may indicate a problem with the user's mobile device) and when they are likely to be resolved, is becoming increasingly important, in the quest to retain customers and reduce customer 'churn' (customers moving from one service provider to another).

In addition, current reporting mechanisms generate hundreds or thousands of alarms across a network simultaneously—far more than a network operations team can sensibly deal with. These alarms are not necessarily indicative of a major issue with that particular part of the network and it is difficult for an operator to prioritise which alarms indicate faults that should be dealt with as a high priority and those which can safely be delayed for hours, days, weeks, or even until the next scheduled maintenance visit (which may be many months away).

Finally, there is an issue of 'confidence' in regard to user-reported network issues—at what point should an operator begin to take notice of, and act upon, user-reported problems in a particular part of the network? User reports are in general subjective-they depend upon the views of the user (e.g. their perception of network speed), rather than objective data points, and so it is not clear what weight to give such subjective reports. At present, an operator is unlikely to take notice of two or three reports in a particular area, however these reports may be the start of a flood of such reports, at which point the operator has a large number of dissatisfied customers. It would be much better to fix the problem before it affects a large number of network users.

One option currently used to try and solve these issues is to monitor and store all of the measurement data taken by every base-station in the network (e.g. network performance characteristics measured by components of the network). The collection and storage of this data is a huge task and involves a vast amount of computing resources, yet it still only provides a network-centric view of what is happening, ignoring the user experience.

SUMMARY OF THE INVENTION

According to a first aspect of the invention there is provided a network monitoring system (or network monitoring tool) for monitoring performance of a utility supply network, the system comprising:
  an asynchronous subsystem configured to:
    receive scheduled measurements of network performance characteristics from a plurality of user equipments (UEs) connected to the network; and
    store the scheduled measurements in a database; and
  a synchronous subsystem configured to:
    receive triggered measurements of network performance characteristics from at least one UE connected to the network; and
    store the triggered performance measurements in the database.

This system provides a way to efficiently collect measurement data from large numbers of UEs, without requiring excessive computing resources. This system makes use of network performance characteristics measured by UEs themselves (e.g. using an app to collect and report back measurements). The system is therefore sensitive to the user experience of the network. The system comprises two distinct sub-systems. An asynchronous subsystem receives and stores regularly scheduled measurements from UEs. A synchronous subsystem is dedicated to receiving triggered measurements—i.e. unscheduled measurements triggered by an event such as receipt of a request from the network for a measurement. Triggered measurements can be used to quickly gather information in potential problem areas of the network, by-passing the scheduled measurement route, and so avoiding delays in processing of the triggered data. This system therefore allows fewer computational resources to be used than in conventional systems, whilst still allowing fast processing of measurements relevant to potential failures.

The scheduled and/or triggered measurements may be stored in the database with a UE identifier and/or a UE location at the time the respective measurements were performed.

In some embodiments, the asynchronous subsystem may be further configured to assign the received scheduled measurements to a processing queue; and batch process scheduled measurements in the processing queue to transfer the scheduled measurements to the database. Batch processing may be repeated after a predetermined internal, for example in the range 2-10 minutes.

In this way, the asynchronous subsystem can process manageable chunks of the large volume of data it receives, providing computational efficiency, whilst at the same time still allowing for immediate processing, by the network monitoring system, of received triggered measurements.

In some embodiments, the triggered measurements comprise measurements associated with a network performance query from a user of the network. A user may query the performance of a network, for example via an app on the UE, or by calling into a call centre. Triggered measurements are then requested (or are automatically send to the system, for example where an app on the UE has been used to make the query), to gather additional information about the query. This allows the subjective information of the user query to be combined with objective measurements of network performance, allowing a more accurate assessment of whether there is a problem in the network.

In some embodiments, the system may further comprise a user report subsystem, wherein the user report subsystem is configured to receive, from a user of a first UE connected to the network, a network performance query; and store information relating to the network performance query in the database, wherein the information relating to the network performance query includes an identifier of the user or of the first UE. The user report subsystem may receive queries directly from UEs, for example from an app running on the UE, or indirectly, as in the case of a user calling a call centre, and the call centre operator entering the query into the user report subsystem.

In such embodiments, upon receipt of the network performance query from the first UE, the system may be configured to request triggered measurements from the first UE. This provides objective data of that user's network experience, to complement the subjective user query.

The synchronous subsystem may be configured to receive the requested measurements from the first UE, and to store the requested measurements in the database such that they are associated with the identifier of the user of the first UE. This allows efficient analysis of the data stored in the database to identify and diagnose faults in the network.

In some embodiments, upon receipt of the network performance query from the first UE, the system is configured to request triggered measurements from one or more further UEs associated with the first UE. For example, the one or more further UEs may be located within a predetermined distance of the first UE (e.g. 1-5 miles), or may be connected to the network by the same base station/otherwise rely on a common network component to access the network. This allows the network operator to quickly gather, via the synchronous subsystem, a wider array of network performance measurements to help in assessing a potential fault in the network, bolstering the objective data to compare to the subjective user query.

In some embodiments, the scheduled measurements and/or triggered measurements may comprise at least one of: average transmitted data rate, average received data rate, peak transmitted data rate, peak received data rate, received signal strength, packet latency, and packet jitter.

In some embodiments, the system may further comprise the database. Alternatively, the database may be external but connected, via a wireless or wired connection, to the components of the system described above.

In some embodiments, the database may be configured to receive (directly, or via a subsystem) and store at least one of: known network alarm conditions; network component performance measurements; known network faults; and known network limitations. Such additional information provides network-centric data (e.g. measured by network components, rather than UEs) to further complement the subjective and objective data described above, and so aid in detection and diagnosis of a network fault.

In some embodiments, the system may be configured to identify a fault in the network based on the scheduled measurements and/or triggered measurements.

In some embodiments, the triggered measurements may comprise scheduled measurements not yet transmitted to the asynchronous subsystem.

In some embodiments, the utility supply network may be a communications network, and may in particular be a cellular communications network.

BRIEF DESCRIPTION OF THE DRAWINGS

By way of example only, certain embodiments of the invention shall now be described by reference to the accompanying drawings, in which.

DETAILED DESCRIPTION

Figure 1:
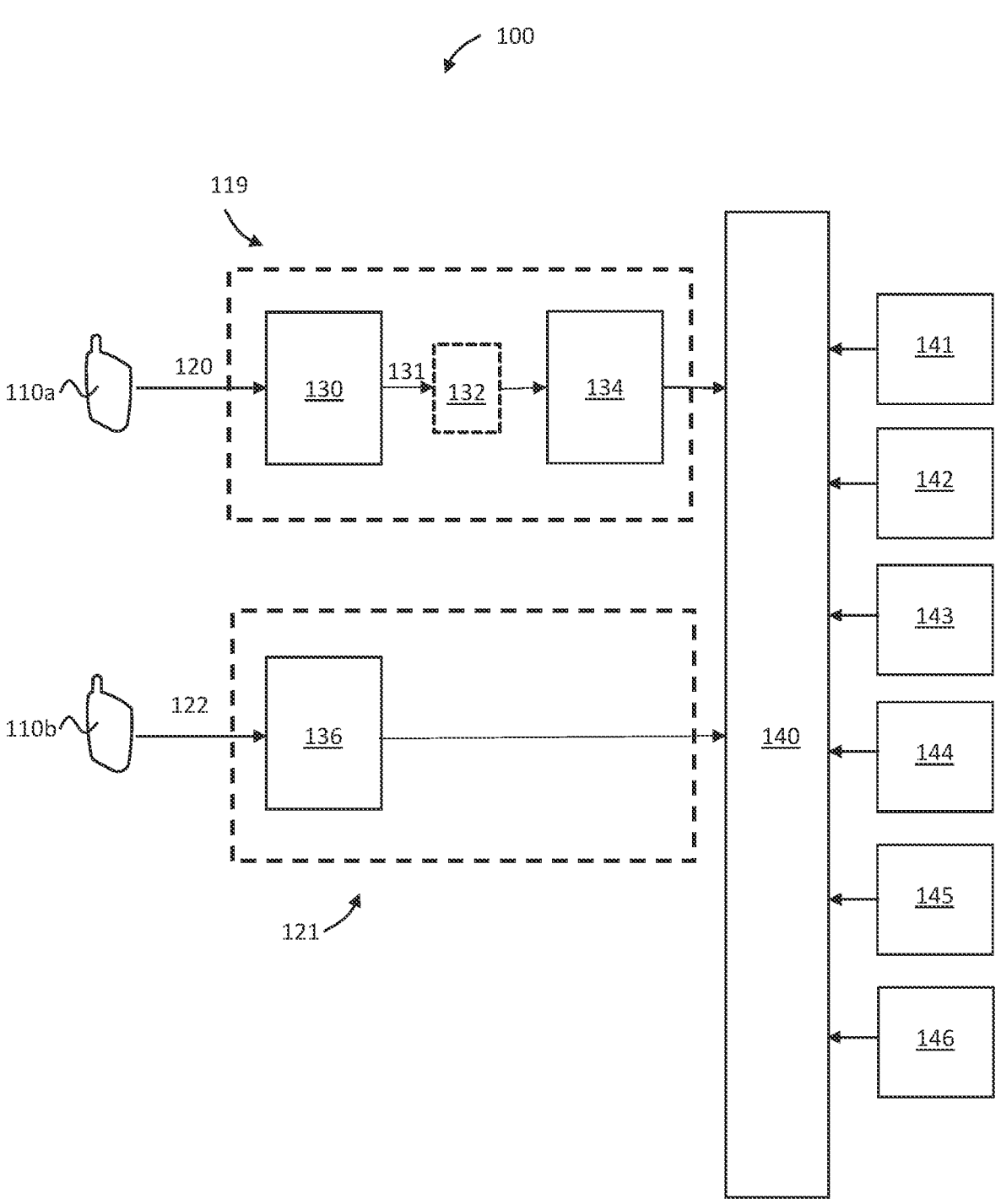
FIG. 1 illustrates a network monitoring system for collecting performance data about a communications network for use in diagnosing faults in the communications network.

The present invention relates to network monitoring of a utility supply network. The following discussion uses a cellular communications network as an example network to illustrate the invention.

As has been discussed above, at any given time a network operator will receive a large number (hundreds or thousands) of alarms and other forms of fault. Some of these alarms will be trivial and indicate a state which is operationally acceptable, but perhaps requires attention at the next planned maintenance visit. An example of this might be a base-station mast-head power amplifier which is running hotter than it ordinarily should or an RNC cabinet temperature which is higher than normal. Most alarms, however, indicate some form of 'failure', for example a lower radio frequency power output from a base-station than should be produced based upon is operational state (e.g. number and range-distribution of users) or a complete shutdown of a site. A network operator does not typically have the resources necessary to inspect, diagnose and repair all of these faults, or even a majority of them, and most networks have to 'live' with a tolerable degree of 'failure' at any given point in time. The operator therefore has to decide how best to deploy maintenance resources whilst achieving the best possible network performance for network users.

In conventional systems, this may be achieved by ranking the sites exhibiting faults based upon the number of users which typically operate via that site, i.e. giving a higher ranking to the sites which are typically the most popular. Other metrics may also be used, for example sites which generate the most revenue—these may not necessarily be the most popular, but may be frequented by the highest-value customers (e.g. cell sites located in a business district). Similar metrics may also be used for other equipment, such as RNCs or transmission links—these will typically result in greater numbers of inconvenienced users as they may well serve multiple sites; this is likely to put them at, or close to, the top of the maintenance ranking.

Whilst this method works, to a degree, it makes assumptions about the numbers of users impacted and about the users' perception of the failure. Taking an extreme example, if a site had failed and other, nearby sites then took over serving the affected users and all of the users were only sending occasional text messages (and doing nothing else), then those users would probably notice little or no difference to their service. The local BTS which had failed, however, might still appear as a high priority to repair, due to the large number of (originally) connected users. In reality, even if the site wasn't repaired for days or weeks, these (text-message-only) users would not notice and nor would they be dissatisfied customers. Conversely, a failed site with fewer but (say) heavy data users, would lead to many more complaints and a very dissatisfied user base. A sensible approach would be to rank the repair of the latter site higher than that of the former; the architecture to be described herein enables this to be achieved.

An alternative approach would be to rank failed sites (or other network components or equipment alarms) according to how many users undertook a 'status check', i.e. used an app on their phone, or a web-site, in order to check if there were known service problems at their location. Such checks are an indication of user dissatisfaction with the service they are receiving, as users rarely make such checks if they are receiving a good service. Whilst this mechanism may appear to solve the above ranking problem, there are a number of issues with it:

1) Users may be suffering congestion on the network which is unrelated to equipment failure, but will still undertake status checks.

2) Users may have experienced a small drop in performance, due to a failure in a local piece of network equipment, but are not suffering unduly. For example they may be experiencing a reduced, but still reasonable, data rate. Such users may well still undertake a status check, but would not be as unhappy as other users, elsewhere on the network, who had suffered a dramatic drop in data rate—the latter would be the higher-priority from a maintenance perspective.

3) Specific types of user may be suffering problems, whereas other users may be unaffected. For example heavy data users and gaming users would suffer if a latency-related problem occurred, whereas lighter data users and voice or text users may not notice a problem at all.

Embodiments of the architecture described herein solves the above problems by providing a mechanism for collecting and amalgamating both 'subjective' data (i.e. status queries and other user-reported metrics) and 'objective' data, such as network performance measurements taken by a user's mobile device of the service quality it is experiencing (e.g. received signal strength, transmitter output power, received and transmitted data rates, latency, voice quality, bit error rate, signal-to-interference, noise and distortion (SINAD) and any other metric which the handset is capable of reporting). An operator can therefore base maintenance rankings/objectives on both pieces of data. Thus for example, an operator may verify that user dissatisfaction, as evidenced by the number of status checks, is matched by a reduction in one or more objective measurement metrics as experienced by that same set of users and checked against any other nearby users (for example, connected to, or via, the same resource—BTS, RNC, transmission link etc.).

Likewise the operator can then report back to the dissatisfied users, acknowledging that there is a fault and providing an indication as to when it might be repaired (e.g. reporting via the app through which they communicated their dissatisfaction).

An outline of the architecture of a network performance measurements capture system 100 is shown in FIG. 1. It is to be noted that each of the blocks within the diagram could be implemented by a physically separate piece of hardware, such as a computer, server, hard disk storage unit or other item of electronic hardware; or some functions could be combined into a single piece of hardware. It is also possible that some or all of these hardware items could be virtualized and be assigned to disparate hardware elements by a third-party service provider, such as a cloud computing services provider. In this case, a 'server' could actually be a virtual server, with tasks executed and spread across a number of physical hardware devices, potentially in different physical locations.

The network monitoring system 100 shown in FIG. 1 essentially consists of two main subsystems, which can be thought of as distinct data 'paths': an asynchronous or 'batch-data' subsystem 119 and a synchronous or 'live-data' subsystem 121.

Asynchronous Subsystem-Batch-Collection Path

The asynchronous subsystem 119 periodically (typically hourly) collects scheduled network performance measurements 120 from user devices 110a connected to the communications network. For example, data may be collected from all user devices 110a connected to the network with a network monitoring app installed. The asynchronous subsystem may comprise one or more inputs for receiving data from the UEs, in particular via the communications network. The asynchronous subsystem transfers the received measurements to a database 140, where they can be analysed to identify network faults.

Given the need to collect scheduled measurements 120 from so many mobile devices 110a connected to the communications network, the asynchronous subsystem 119 is designed to handle very large volumes of data. For example, although measurement data 120 is typically collected from each user device 110a every hour, the exact collection times from each individual user device 110a may be randomly staggered to ensure that not all mobile devices 110a are trying to send their measurement data 120 simultaneously.

The scheduled measurements 120 comprise measurements taken by the mobile device 110a of the network service quality it is experiencing (for example, received signal strength, transmitter output power, received and transmitted data rates, latency, voice quality, bit error rate, signal-to-interference, noise and distortion—SINAD—and any other metric which the mobile device 110a is capable of reporting).

In the illustrated system 100, asynchronous subsystem 119 comprises a measurement collection server 130 and a measurements batch processor 134.

The measurement collection server 130 generates a measurement report 131 for each set of scheduled measurements 120 from a mobile device 110a. The measurement report 131 contains the scheduled measurements 120 with a time-stamp at which the measurements 120 were collected, and an identifier associated with the mobile device 110a (which is typically an anonymised version of the identifier provided by the mobile device 110a to protect user privacy). This type of measurement collection is classed as 'asynchronous' as it does not elicit the transmission of measurement data from the user device 110a, but instead waits for the user device 110a to send the data at a time of that device's choosing. This interval is typically hourly, but can be set by the network operator. The infrequent nature of this batch data is largely in order to preserve battery life, as discussed in co-pending application GB2573830, which is hereby incorporated herein by reference.

The measurement collection server 130 typically adds each measurement report data file 131 to a data queue 132 to await processing by the measurements batch processor 134. The measurements batch processor 134 takes the measurement report data files 131 from the data queue 132 and essentially provides a translating/transformation process, converting the measurement report data files 131 and the data within them into the correct format to be stored efficiently in the database 140.

The data leaving the measurements batch processor 134 to enter the database 140 typically contains one or more of the following:

1) Anonymised identification—the identifier of the user device from which the data originated is discarded and an anonymous (random) identity is attached. This allows the data from a particular mobile device 110a to be assessed over time without (potentially) infringing the privacy of the user of the mobile device 110a. Anyone interrogating the database 140 would be unable to identify the mobile device 110a or its user, only that measurements have come from the same mobile device 110a or user.

2) A randomised identifier for the measurement report itself, to allow duplicates to be recognised and eliminated.

3) A location identifier indicating the network area in which the mobile device 110a was operating at the time the measurements were taken, and/or a location of the mobile device at the time of the measurements, such as a GPS measurement. The network area in which the mobile device was operating may be a region selected from a number of predefined network regions, as described in co-pending applications GB1820857.9 and GB1820852.0, which are hereby incorporated herein by reference 4) The location of the cell site which was serving the mobile device 110a at the time the measurements were taken.

5) The (compass) bearing of the mobile device 110a from that cell site.

6) The approximate distance of the mobile device 110a from the cell site's location.

The measurements batch processor 134 typically runs periodically (hence the requirement for the data queue 132), with an interval between initiating each run typically being around five minutes.

Although only a single measurement collection server 130 is shown in FIG. 1, it is possible to have multiple measurement collection servers 130, each feeding one or more batch processors 134.

Advantageously, the asynchronous subsystem 119, or components thereof, may be scalable—i.e. more (cloud) computing resources may be added as required, depending upon the volume of measurements being received at a given time. This may well increase over time as more customers are encouraged to sign-up to use the operator's service-reporting app.

Synchronous Subsystem—Live-Data Collection Path

Synchronous subsystem 121 collects triggered network performance measurements 122 from a mobile device 110b (which may or may not be the same as mobile device 110a). The triggered measurements comprise 'live' data, in the sense that they record the network service quality the device 110b is experiencing at that point in time (for example, received signal strength, transmitter output power, received and transmitted data rates, latency, voice quality, bit error rate, signal-to-interference, noise and distortion—SINAD—and any other metric which the mobile device 110b is capable of reporting).

Triggered measurements 122 may be transmitted to the synchronous subsystem 121 in response to the generation of subjective data. For example, a user performing a status check from their mobile device 110b may cause triggered measurements 122 to be obtained from the mobile device 110b which requested the status query.

Triggered measurements 122 may also be requested from other mobile devices 110b which have not initiated a status query, but which happen to be local to an area of interest, for example an area of interest associated with a (different user's) user query. The area of interest may be based for example upon the number of status checks in that area or a specific operator interest (such as a stadium during an event). In both cases, the trigger for the collection of triggered measurements 122 is subjective, i.e. a network user is, in their opinion, experiencing a poor or degraded level of service relative to that which they have experienced in the past or would reasonably expect to receive. This is inherently subjective, as different users will have differing opinions (or thresholds) as to what constitutes 'poor' or 'degraded'. Collecting triggered measurements 122 from other mobile devices 110b may aid in determining whether the issue which caused a user to initiate a status check is unique to that user (meaning that it may well be a problem with their mobile device 110b) or more general to the area (and if so, ascertain how widespread the issue might be). A more general experience of the problem (e.g. a low data rate) may well indicate that there is an issue with the communications network in that area.

Other triggers may also initiate collection of triggered measurements 122, such as submitting web-based status requests or complaints. In this case, full measurement data 122 data may be collected from nearby mobile devices 110b while simpler data (such as network speed) may be collected from the web-based user or users. It is also possible to infer the identity of the connection type of the web-based user (i.e. Wi-Fi or cellular). In the case of a cellular connection, the network speed will indicate the user's network experience. If the user is connected over Wi-Fi, this may indicate that there is a catastrophic issue with the cellular network in that area (since the user needs to resort to Wi-Fi to request a status check). Measurement data from web-based users can be filtered out (and not used in subsequent fault analysis, for example) if the user is identified as not using the network operator's network when making the status check or not using it in the location about which the status check or coverage query is made.

The synchronous subsystem 121 typically comprises fewer servers (perhaps one-tenth of the number involved in the asynchronous subsystem119), since far less triggered measurement data 122 is collected (or needs to be collected) than scheduled measurement data 120—triggered measurements 122 only need to be collected in response to a user-initiated status check and there are few of these relative to the number of mobile devices 110b active on the communications network at a given point in time. Essentially, triggered measurements 122 are only uploaded when it is interesting to do so, that is, there is an immediate reason to do so, and this uploading is undertaken effectively immediately. This type of measurement collection is classed as 'synchronous' as measurements are elicited (either by the system 100 or otherwise) from the user device 110b, and processed into database 140 immediately upon receipt, rather than being batched for later processing.

The synchronous subsystem 121 illustrated in FIG. 1 comprises a triggered measurements server 136. The triggered measurements server 136 collects, formats, and enters the triggered measurements 122 into the database 140, optionally along with one or more of the following:

1) Anonymised identification—the identifier of the mobile device 110b from which the live measurement data 122 originated is discarded and an anonymous (random) identity is attached. This allows the live measurement data 122 from a particular mobile device 110b to be assessed over time without (potentially) infringing the privacy of the user of the mobile device 110b. Anyone interrogating the database 140 would be unable to identify the mobile device 110b or its user, only that measurements have come from the same mobile device 110b or user.

2) A randomised identifier for the live measurement data report itself, to allow duplicates to be recognised and eliminated.

3) A location identifier indicating the network area in which the mobile device 110b was operating at the time the measurements were taken (as discussed above in relation to scheduled measurements).

4) The location of the cell site which was serving the mobile device 110b at the time the measurements were taken.

5) The (compass) bearing of the mobile device 110b from that cell site.

6) The approximate distance of the mobile device 110b from the cell site's location.

Transmission of triggered measurements 122 to the synchronous subsystem 121 may be triggered by the network monitoring system 100 (for example when system 100 detects receipt of a user query), or another component of the communications network. Alternatively, transmission may be triggered by the UE 110b itself, for example when the UE 110b detects that its user has made a status query.

In addition to 'live' data—i.e. data measured only after detection of a triggering event, the triggered measurements 122 may also comprise performance measurements already measured and stored as part of a scheduled measurement, but not yet transmitted to the asynchronous subsystem 119 as part of a standard scheduled measurement report 120.

There are a range of mechanisms by which a user may initiate a network performance query (e.g. a 'status check'), which can then trigger collection of triggered measurement data 122. In particular, one or more of the following mechanisms may be used:

1. A call to a customer service centre complaining of poor service or checking coverage at a particular location.
2. A query can be submitted via a network monitoring app, or a billing or other more general customer-service related app, on the user's mobile device.
3. A query can be submitted via a web page (e.g. the operator's website), either on the user's mobile device or any other suitable (fixed or mobile) terminal.
4. Social Media: Social media feeds (e.g. Twitter, Facebook, web-chats etc.) can be monitored (either automatically via suitable software or manually by human operatives) for 'chat' indicating a likely service outage at a particular location.
5. In-store: Many network operators have a presence on the high street via their own, branded, shops or concessions within other shops. Customers will sometimes complain of coverage issues, in person, when visiting such outlets.

The ability to be able to collect live user data immediately, rather than having to wait until the next batch is sent/downloaded automatically, is key in providing timely information to an operator, in order to allow a problem to be quickly rectified. Similarly, the ability to process that live data quickly, rather than it being delayed by large amounts of scheduled measurements for non-relevant network areas, is key to rapidly responding to a problem. For example, an emerging issue can often be solved quickly (i.e. in minutes) by simply re-setting the piece of equipment which appears to be causing the issue. This can be undertaken remotely (e.g. from the network operations centre) and therefore not require a site visit by a maintenance team. Likewise, the issue could have been caused by a software upgrade to some part of the network or a network configuration change (e.g. a remotely-controlled change to the pointing angle of an antenna)—in either case it is a relatively simple matter to reverse the update or change and (hopefully) restore service to the user concerned, without necessitating a site visit.

Database 140

The database 140 stores the measurement data 120, 122. Data may be stored in the form of records or tuples, within tables, in the database structure. The database is typically an off-the-shelf product (such as Oracle®, Postgres® and the like) which is configured for this specific application (i.e. that of storing, and allowing access to, data collected from individual mobile devices 110a, 110b). It may be accessed by the network operator directly or by other systems owned, managed or used by the network operator.

The database 140 may also store data from a range of other pertinent data sources to aid in fault diagnosis, such as:

1) Data 141 relating to network change requests (requests for changes to the network configuration, such as the position or pointing angle of one or more antennas, the installation or de-commissioning of a base-station, etc.) and/or planned maintenance operations. This can help to inform decisions regarding whether a network change may be the root cause of an increase in the number of status checks locally to the change or if they may simply be as a result of a planned local outage in the network for maintenance or upgrade purposes.

2) Data 142 relating to 'trouble tickets' and/or known incidents on the network. These are incidents or problems of which the network operator is already aware and which may or may not be being dealt with already. Such information can be communicated to the users (e.g. in response to a status check), as appropriate.

3) Data 143 relating to network configuration information, such as cell-site locations, RNC/BSC parents and connectivity, antenna pointing angles, transmit power levels, etc. This information can be used, for example, to determine from which nearby user devices measurement data should be requested, in the event of one or more local users initiating a status check.

4) Data 144 relating to network alarms. This can be used to correlate status checks and (poor) measurement data with known alarm conditions and, potentially, thereby raise their status within the maintenance hierarchy.

5) Data 145 relating to network performance characteristics, such as the amount of traffic being handled by each cell and the availability of each cell.

6) Data 146 from a network planning tool, including the designed network topology (which may not necessarily exactly match the network as deployed). This database will contain coverage maps and coverage predictions and may be used to assess whether the reported issue stems simply from the fact that the user is outside of the designed network coverage area.

Data 143, 145 and 146 in particular may provide the basis for a root-cause analysis to be undertaken, in order to identify the location (within the network hierarchy) of the faulty element.

User Report Subsystem

Figure 2:
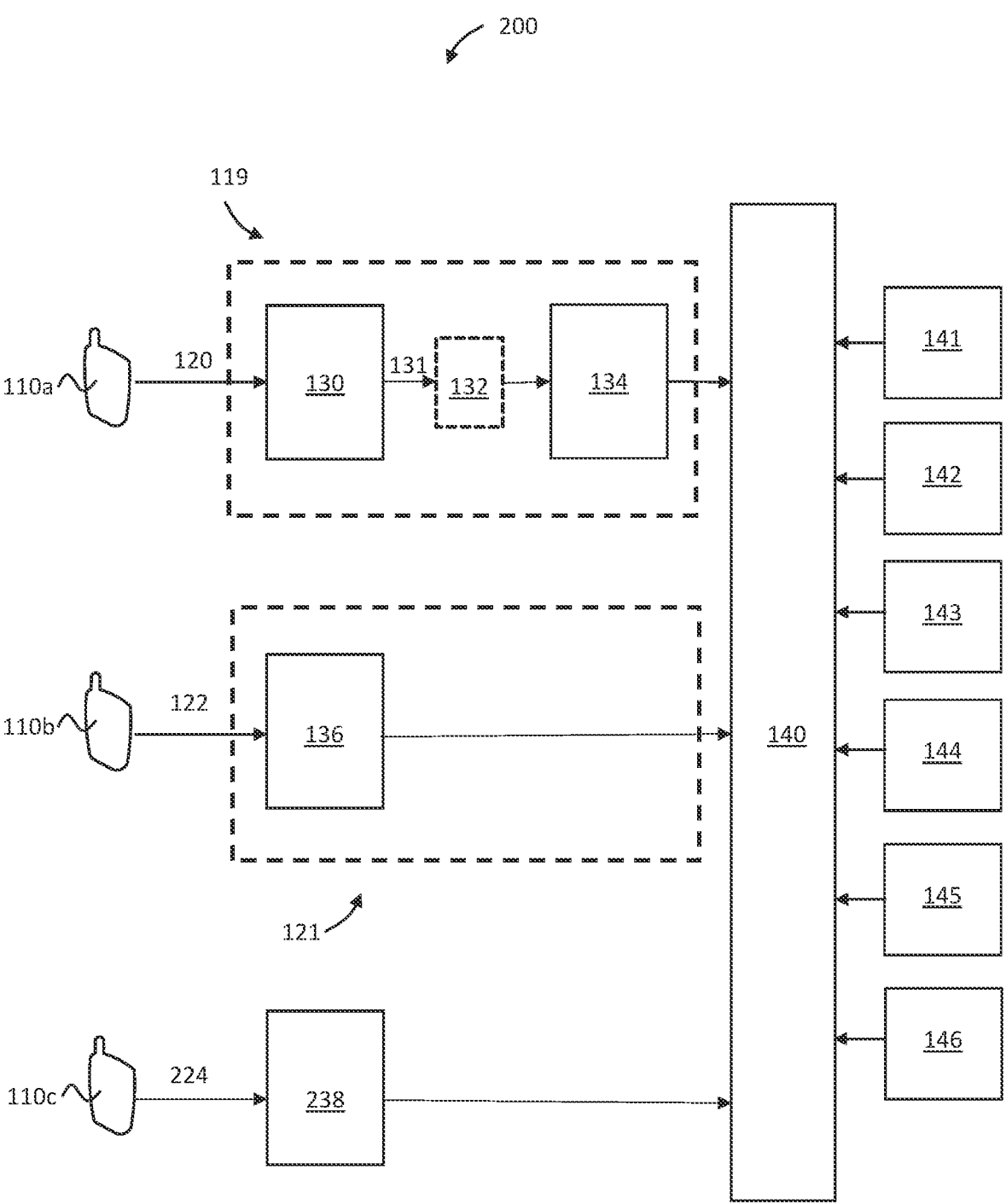
FIG. 2 illustrates an alternative network monitoring system.

FIG. 2 illustrates an alternative network monitoring system 200. Network monitoring system 200 comprises all the features of system 100 (represented by the same reference numerals as in FIG. 1), performing the same functions of collecting and storing scheduled and triggered network performance measurements—i.e. 'objective' data.

System 200 further comprises a user report subsystem 230, configured to receive user queries/status checks 224 from a user of a device 110c (which may or may not be the same as mobile devices 110a, 110b), and to store received queries in database 140. Subsystem 230 thus collects 'subjective' data. Subjective data collected by the user report subsystem 230 may generally be considered to be any performance data related to a user's perception of network performance.

As discussed above, user queries may be received directly from a device 110c (e.g. from an app), or indirectly (e.g. via a call centre). For example, user network performance queries may be received by one or more of the following methods:

Status checks—these are checks made by the user, typically using an app on their mobile device 110c that has been provided for the purpose by the network operator (the app typically has many other functions as well, such as providing the ability to access the user's bill, usage to date, coverage maps etc.). The user will typically undertake a status check when they are experiencing a problem with the communications network or when they are receiving a poorer service than they might expect. A status check typically involves pressing a virtual button in the app on the touch-screen of the mobile device 110c which sends a message to the network operator asking if there is any known problem on the communications network local to the user. If there is a known problem, an explanatory message will typically be sent to the user's mobile device 110c in response, acknowledging that there is a problem and perhaps indicating the nature of the problem and when it will be rectified. A status check can also be undertaken in a similar way using a web browser pointed to the operator's website.

Feedback reports—these can either be reports voluntarily submitted by the user (for example, via the network operator's website) which are essentially complaints about the service the user is receiving, or reports elicited by the network operator sending out a survey to selected users. Such surveys could, for example, be targeted at users in an area where it is possible that a problem exists—where other local users have undertaken status checks, for example—and the network operator wants to understand other users' experiences.

Notification subscriptions—users can subscribe to notifications relating to when a network repair will be completed. A large number of such subscriptions (in a given area) could indicate that a large number of users are very unhappy about the service (or the lack of service) that they are currently receiving and are keen to know the moment it is restored to normal.

Calls to a call centre—users may call a customer service call centre to ask about the status of the network in their local area and to report problems with their service. A large number of calls from a particular area could indicate that there is a problem in that area.

Each of these options may be considered to be a 'network performance query' within the meaning of the present disclosure.

There are, of course, many other possible ways in which a user could communicate their subjective view of the network (for example, via social media, either involving the operator or just complaining generally). It should be emphasised that all of the above queries (from users) are subjective—they relate to the user's perception of the network—and do not necessarily indicate that a fault exists, simply that the network, for whatever reason, does not meet the expectations of that particular user, in that particular location, at that particular time. Clearly, however, a large number of such queries, in a given area, at a given time, are potentially indicative of a network problem, even if that problem is simply 'congestion'.

The user queries 224 may be collected automatically (for example, from status checks performed on an app or website, or electronic feedback reports) or manually entered (for example, following a call with a call centre, the operator may manually enter the user queries 224 into the user report subsystem 238). The user report subsystem 238 processes the user query 224 into a format suitable for database 140, before loading the user query 224 onto the database 140 where it is associated with an anonymised device identifier for the particular mobile device 110c, to allow the subjective data to later be associated with other relevant performance data for the particular mobile device 110c, such as the objective measurement data discussed above.

Combining Subjective Data and Objective Data

When data in the database 140 is associated with an (anonymised) identifier for each mobile device 110a-c, subjective data (e.g. user queries received by user report subsystem 238) based on status checks and other information provided by the user of the mobile device 110c can be associated with objective data (scheduled and/or triggered measurements 120, 122) from the same mobile device 110a,b.

For example, if a user requests a status check from the network operator's app running on mobile device A, data relating to the status check will be stored on the database 140 with an anonymised identifier associated with mobile device A. Simultaneously, or soon after, triggered measurement data 122 may be requested from mobile device A, either by the triggered measurements server 136 (or generally system 100), or the app itself, and this triggered measurement data 122 may also be assigned to the anonymised identifier associated with mobile device A.

Asynchronous measurement data 120 derived from mobile device A may also be assigned to the anonymised identifier associated with mobile device A. The timestamp associated with the or each batch of asynchronous measurement data 120 may be used by system 100 to determine the relevance of this data to the current issue (if any) which resulted in the user requesting a status check. For example if the timestamp indicates that the or a batch of data is more than H hours old, then that measurement data may be disregarded in any fault analysis or diagnosis if H is greater than a threshold duration (1 hour or 4 hours or any other value).

In this way, the subjective and objective data may be combined when the database is queried to form a richer and more powerful resource to assist the network operator in identifying and diagnosing faults within the network.
User Feedback In addition to the main database 140 being connected to an operator's other systems, it may also connect to a user-feedback subsystem to inform the user of likely faults, and/or provide estimates of repair times. For example a user feedback subsystem may provide a colour coded response to indicate to the user whether the network is (or should be) operating normally at his/her location (in response to a status check), together with an appropriate message from the operator, for example to indicate a time-to-repair for the fault (if a known fault is present).
Application to Other Utility Supply Networks It is possible to apply the invention described above to diagnose faults in all kinds of communications networks, including 2G, 3G, 4G, 5G, PMR/SMR, Wi-Fi, etc.

Equally, it is possible to apply the invention to a fixed-line data network, such as a 'broadband' internet network (e.g. using DSL, fibre optics or similar). In such a case, the invention could be used to diagnose faults in roadside cabinets containing switching or routing equipment or any other equipment which serves a number of users in a given locality. For example, a user connected to the same roadside cabinet who was experiencing poor service could perform a service check (e.g. using a device connected to a cellular data service) and data about the service could be measured (such as upload and download speeds) from the user and other users connected to the same roadside cabinet.

Although the invention has been described above with reference to one or more preferred embodiments, it will be appreciated that various changes or modifications may be made without departing from the scope of the invention as defined in the appended claims.

The invention claimed is:

1. A network monitoring system for monitoring performance of a utility supply network, the system comprising:
an asynchronous subsystem configured to:
receive scheduled measurements of network performance characteristics automatically from a plurality of user equipments (UEs) connected to the network; and
store the scheduled measurements in a database; and
a synchronous subsystem configured to:

receive a network performance query manually generated by a user of a UE of the plurality of UEs connected to the utility supply network, and upon receipt of the network performance query, request triggered measurements to be taken by the UE and about which the network performance query was generated, without interaction with the user of that UE, wherein the triggered measurements are of network performance characteristics of the UE about which the performance query was generated;
receive the triggered measurements of network performance characteristics from the UE about which the performance query was generated; and
store the triggered measurements in the database.

2. The system of claim 1, wherein the asynchronous subsystem is further configured to:
assign the received scheduled measurements to a processing queue; and
batch process scheduled measurements in the processing queue to transfer the scheduled measurements to the database.

3. The system of claim 1, wherein the triggered measurements comprise measurements associated with a network performance query from a user of the network.

4. The system of claim 1, further comprising a user report subsystem, wherein the user report subsystem is configured to:
receive, from a user of a first UE connected to the network, a network performance query; and
store information relating to the network performance query in the database, wherein the information relating to the network performance query includes an identifier of the user or of the first UE.

5. The system of claim 4, wherein the synchronous subsystem is configured to receive the triggered measurements from the first UE, and to store the triggered measurements in the database such that they are associated with the identifier of the user of the first UE.

6. The system of claim 4, wherein, upon receipt of the network performance query from the first UE, the system is configured to request triggered measurements from one or more further UEs associated with the first UE.

7. The system of claim 6, wherein the one or more further UEs are located within a predetermined distance of the first UE.

8. The system of claim 1, wherein the scheduled measurements and/or triggered measurements comprise at least one of: average transmitted data rate, average received data rate, peak transmitted data rate, peak received data rate, received signal strength, packet latency, and packet jitter.

9. The system of claim 1, further comprising the database.

10. The system of claim 9, wherein the database is configured to receive and store at least one of: known network alarm conditions; network component performance measurements; known network faults; and known network limitations.

11. The system of claim 1, wherein the system is configured to detect a fault in the network based on the scheduled measurements and/or triggered measurements.

12. The system of claim 1, wherein the triggered measurements comprise scheduled measurements not yet transmitted to the asynchronous subsystem.

13. The system of claim 1, wherein the utility supply network is a communications network.

* * * * *